(No Model.)

L. G. CUNNINGHAM.
PUMP.

No. 504,122. Patented Aug. 29, 1893.

Witnesses:
C. H. Raeder
K. F. Matthews

Inventor
Levi G. Cunningham
By James J. Sheehy
Attorney.

UNITED STATES PATENT OFFICE.

LEVI G. CUNNINGHAM, OF GREENSBURG, INDIANA.

PUMP.

SPECIFICATION forming part of Letters Patent No. 504,122, dated August 29, 1893.

Application filed April 26, 1893. Serial No. 471,930. (No model.)

*To all whom it may concern:*

Be it known that I, LEVI G. CUNNINGHAM, a citizen of the United States, residing at Greensburg, in the county of Decatur and State of Indiana, have invented certain new and useful Improvements in Pumps; and I do declare the following to be a full, clear, and exact description of the invention, such as will enable others skilled in the art to which it appertains to make and use the same.

My invention relates to improvements in filter pump spouts or that class of spouts which embody a filtering medium; and it consists in the peculiar construction, novel combination and adaptation of parts as will be hereinafter described and particularly pointed out in the claim appended.

Figure 1:
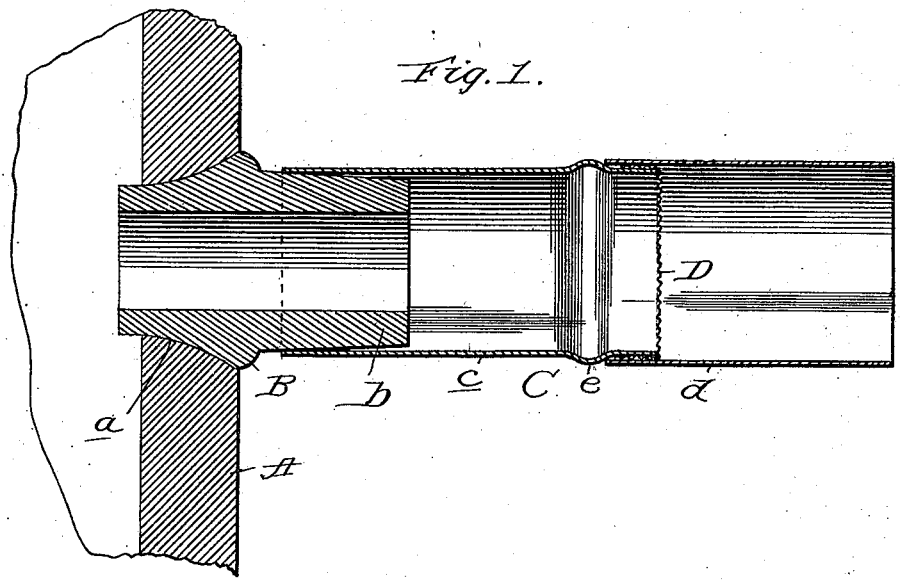
Figure 2:
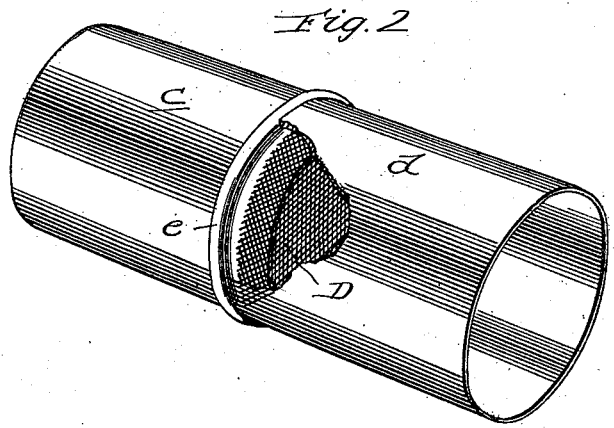

In the accompanying drawings: Figure 1, is a vertical section of a pump body with my improved filter spout in position, and Fig. 2, is a perspective view of the filter spout, with a portion broken away to better illustrate the manner of securing the filtering medium.

In the said drawings, the letter A, indicates a pump body which may be of the ordinary or any approved form and construction, and B, indicates the nipple of my improved spout. This nipple is fixed in the discharge aperture $a$, of the body A, and it has its outer portion $b$, slightly tapered toward its free end, as shown, whereby it will be seen that the spout C, may be readily placed and secured in position, and may be as readily removed when desired. The removable spout C, is preferably formed from metal, and it comprises the inner tubular section $c$, and the outer tubular section $d$, which is mounted upon the section $c$, as shown. The said section $c$, is provided adjacent to its outer end with a peripheral rib $e$, which serves to limit the adjustment of the section $d$, and enables the same to securely hold the filtering gauze D, which has its edge interposed between the sections $c$, $d$, as illustrated.

By the construction described, it will be seen that the spout C, may be readily removed from the nipple B, when the gauze or diaphragm has become foul, and a jet of water may be passed through the spout until it is thoroughly cleansed, or, if necessary, the sections $c$, $d$, may be separated and the diaphragm or gauze washed by itself. Furthermore it will be seen that when the diaphragm or gauze D, has become worn or damaged, it may be readily removed by simply separating the sections $c$, $d$, and a new diaghragm or gauze may be easily placed and secured in position.

It will be noted from the foregoing description taken together with the drawings, that my improved spout while very simple, serves to effectually free the water of mud and sediment; and it will also be noted that the spout is durable and may be easily repaired and that it is therefore almost as cheap as the ordinary spout.

I am well aware that it is old as shown in the patent of one McMillin, No. 370,639, of September 27, 1887, to provide a milk pail with a fixed spout and a removable tubular section adapted to take over the spout so as to confine a straining cloth thereon.

I am also aware that it is old as shown in the patent of H. Clayton, No. 256,125, of April 11, 1882, to provide a pump spout with a fixed collar having a series of lugs and a removable collar or annulus carrying a filtering medium and having bayonet slots adapted to engage the lugs of the fixed collar; and I therefore make no claim to such construction but

What I claim, and desire to secure by Letters Patent, is—

In a pump, the combination with the body and a nipple secured to and extending from the body; of the spout comprising the tubular section $c$, mounted and frictionally held on the nipple and having the peripheral rib $e$, adjacent to its outer end, the tubular section $d$, mounted on the outer end of the section $c$, and a filtering gauze or diaphragm bearing against the outer end of the section $c$, and having its edge interposed between said section $c$, and the section $d$, as and for the purpose set forth.

In testimony whereof I affix my signature in presence of two witnesses.

LEVI G. CUNNINGHAM.

Witnesses:
JAMES MCCONNELL,
CHARLES R. PORTER.